US012266795B2

(12) United States Patent
Yamauchi

(10) Patent No.: US 12,266,795 B2
(45) Date of Patent: *Apr. 1, 2025

(54) POSITIVE ELECTRODE ACTIVE MATERIAL FOR SODIUM-ION SECONDARY BATTERY

(71) Applicant: NIPPON ELECTRIC GLASS CO., LTD., Otsu (JP)

(72) Inventor: Hideo Yamauchi, Otsu (JP)

(73) Assignee: NIPPON ELECTRIC GLASS CO., LTD., Shiga (JP)

(*) Notice: Subject to any disclaimer, the term of this patent is extended or adjusted under 35 U.S.C. 154(b) by 5 days.

This patent is subject to a terminal disclaimer.

(21) Appl. No.: 16/617,076

(22) PCT Filed: Jun. 12, 2018

(86) PCT No.: PCT/JP2018/022450
§ 371 (c)(1),
(2) Date: Nov. 26, 2019

(87) PCT Pub. No.: WO2019/003904
PCT Pub. Date: Jan. 3, 2019

(65) Prior Publication Data
US 2020/0112025 A1  Apr. 9, 2020

(30) Foreign Application Priority Data
Jun. 28, 2017 (JP) ................. 2017-125912

(51) Int. Cl.
H01M 4/00 (2006.01)
H01M 4/505 (2010.01)
H01M 4/525 (2010.01)
H01M 10/054 (2010.01)
H01M 4/02 (2006.01)

(52) U.S. Cl.
CPC .......... H01M 4/525 (2013.01); H01M 4/505 (2013.01); H01M 10/054 (2013.01); *H01M 2004/028* (2013.01)

(58) Field of Classification Search
CPC .... H01M 4/525; H01M 4/505; H01M 10/054; H01M 10/0562; H01M 2004/028; H01M 4/5825; Y02E 60/10; C01B 25/45
See application file for complete search history.

(56) References Cited

U.S. PATENT DOCUMENTS

| 9,466,855 | B2* | 10/2016 | Ito | H01M 4/587 |
| 11,289,700 | B2* | 3/2022 | Whittingham | C08K 3/04 |
| 11,289,703 | B2* | 3/2022 | Yamauchi | H01M 10/054 |
| 11,387,455 | B2* | 7/2022 | Yamauchi | H01M 4/136 |
| 11,515,534 | B2* | 11/2022 | Yamauchi | H01M 4/505 |
| 2002/0192553 | A1 | 12/2002 | Barker et al. | |
| 2004/0206938 | A1 | 10/2004 | Barker et al. | |
| 2005/0238961 | A1 | 10/2005 | Barker et al. | |
| 2006/0091363 | A1 | 5/2006 | Barker et al. | |
| 2006/0194113 | A1* | 8/2006 | Okada | C01B 25/45 429/231.95 |
| 2007/0072034 | A1 | 3/2007 | Barker et al. | |
| 2007/0160519 | A1 | 7/2007 | Barker et al. | |
| 2011/0052986 | A1 | 3/2011 | Barker et al. | |
| 2011/0117415 | A1* | 5/2011 | Saka | H01M 50/449 429/224 |
| 2011/0210288 | A1 | 9/2011 | Barker et al. | |
| 2014/0197358 | A1 | 7/2014 | Nose | |
| 2015/0180024 | A1* | 6/2015 | Nose | H01M 4/5825 429/223 |
| 2015/0280215 | A1* | 10/2015 | Nose | H01M 10/054 429/231 |
| 2015/0303470 | A1 | 10/2015 | Honma et al. | |
| 2016/0126595 | A1* | 5/2016 | Fukunaga | H01M 4/5825 429/340 |
| 2017/0005337 | A1* | 1/2017 | Ikejiri | H01M 10/054 |
| 2017/0217774 | A1 | 8/2017 | Ikejiri et al. | |
| 2017/0346094 | A1 | 11/2017 | Yamauchi | |

FOREIGN PATENT DOCUMENTS

| CN | 105637694 A | 6/2016 | |
| CN | 105836724 A | 8/2016 | |
| CN | 106537667 A | 3/2017 | |
| CN | 106575766 A | 4/2017 | |
| JP | 2006-523930 A | 10/2006 | |
| JP | 4643903 B2 | 3/2011 | |
| JP | 5673836 B2 | 2/2015 | |
| JP | 2016-025067 A | 2/2016 | |
| JP | 2017-045538 A | 3/2017 | |
| WO | 2013/035572 A1 | 3/2013 | |
| WO | WO-2015087734 A1 * | 6/2015 | H01B 1/08 |
| WO | 2016/084573 A1 | 6/2016 | |

OTHER PUBLICATIONS

Official Communication issued in International Patent Application No. PCT/JP2018/022450, mailed on Sep. 11, 2018.
Kim et al., "Defect-Controlled Formation of Triclinic Na2CoP2O7 for 4 V Sodium-Ion Batteries", Angewandte Chemie International Edition, vol. 55, Issue 23, Apr. 21, 2016, pp. 6662-6666.
Lin et al., "Synthesis, structural, and electrochemical properties of NaCo(PO3)3 cathode for sodium-ion batteries", Journal of Solid State Electrochemistry, vol. 20, No. 5, Jan. 12, 2016, pp. 1241-1250.
Barpanda et al., "A layer-structured Na2CoP2O7 pyrophosphate cathode for sodium-ion batteries", http://www.rsc.org/suppdata/ra/c3/c3ra23026k/c3ra23026k.pdf, 2013, 6 pages.
Official Communication issued in corresponding Chinese Patent Application No. 201880025224.4, mailed on Jul. 13, 2022.
Kim et al., "Defect-Controlled Formation of Triclinic Na2CoP2O7 for 4 V Sodium-Ion Batteries", Angewandte Chemie International Edition, vol. 55, Issue 23, Apr. 21, 2016, including Supporting information, Oct. 22, 2016, 23 pages.
Official Communication issued in corresponding Chinese Patent Application No. 201880025224.4, mailed on Feb. 9, 2022.

* cited by examiner

*Primary Examiner* — Nicholas P D'Aniello
(74) *Attorney, Agent, or Firm* — Keating & Bennett, LLP

(57) ABSTRACT

Provided is a novel positive electrode active material for a sodium-ion secondary battery having a high voltage and a high capacity. The positive electrode active material for a sodium-ion secondary battery is made of crystals represented by a general formula $Na_x(Co_{1-a}M_a)_yP_2O_z$ (where M represents at least one transition metal element selected from the group consisting of Fe, Cr, Ni, and Mn, $0.6 \leq x \leq 4$, $0.3 \leq y \leq 2.7$, $0 \leq a \leq 0.9$, and $6 \leq z < 7.5$).

5 Claims, No Drawings

POSITIVE ELECTRODE ACTIVE MATERIAL FOR SODIUM-ION SECONDARY BATTERY

TECHNICAL FIELD

The present invention relates to positive electrode active materials for sodium-ion batteries used in portable electronic devices, electric vehicles, and so on.

BACKGROUND ART

Lithium-ion secondary batteries have secured their place as high-capacity and light-weight power sources essential for mobile electronic terminals, electric vehicles, and so on and attention has been focused, as their positive electrode active materials, on active materials containing olivine crystals represented by the general formula $LiFePO_4$. However, as for lithium, there are concerns about such issues as global rise in raw and processed material costs and, therefore, studies have recently been conducted on positive electrode active materials made of $Na_2FeP_2O_7$ crystals or like Fe-based crystals, $NaCoPO_4$ crystals, $Na_4Ni_3(PO_4)_2(P_2O_7)$ crystals or like Ni-based crystals, in each of which sodium is used as an alternative to lithium (see, for example, Patent Literatures 1 to 3).

CITATION LIST

Patent Literature

[PTL 1]
Japanese Patent No. 5673836
[PTL 2]
Japanese Patent No. 4643903
[PTL 3]
JP-A-2016-25067

SUMMARY OF INVENTION

Technical Problem

A positive electrode active material made of $Na_2FeP_2O_7$ crystals has a problem with the discharge voltage being as low as about 2.9 V. A positive electrode active material made of $NaCoPO_4$ crystals has a problem of low discharge capacity and also has a problem of the difficulty forming, in an electrode material containing a solid electrolyte, a sodium ion-conducting path between the crystals and the solid electrolyte and consequent inoperativeness as a battery. A positive electrode active material made of $Na_4Ni_3(PO_4)_2(P_2O_7)$ crystals has a relatively high discharge voltage, but has a problem of low discharge capacity.

In view of the above situations, the present invention has an object of providing a novel positive electrode active material for a sodium-ion secondary battery having a high voltage and a high capacity.

Solution to Problem

The inventor has found from intensive studies that the above problems can be solved by a positive electrode active material made of crystals having a particular composition containing a Co component and proposes the positive electrode active material as the present invention.

Specifically, a positive electrode active material for a sodium-ion secondary battery according to the present invention has a feature of being made of crystals represented by a general formula $Na_x(Co_{1-a}M_a)_yP_2O_z$ (where M represents at least one transition metal element selected from the group consisting of Fe, Cr, Ni, and Mn, $0.6 \leq x \leq 4$, $0.3 \leq y \leq 2.7$, $0 \leq a \leq 0.9$, and $6 \leq z < 7.5$). The crystals represented by the above general formula easily form a sodium ion-conducting path with a solid electrolyte, so that the discharge capacity is likely to increase. In addition, with the crystals represented by the above general formula, the phosphoric acid component forming the skeleton of the crystal structure consists mainly of pyrophosphoric acid ($P_2O_7$) or metaphosphoric acid ($PO_3$), so that the crystal structure has high stability. Therefore, oxygen extraction from the active material is less likely to progress in the oxidation reaction during the first charge and a capacity decrease is less likely to occur even after repeated charge and discharge (in other words, the cycle characteristics are good).

The positive electrode active material according to the present invention is basically made of crystals only and has a structure containing no amorphous phase. By doing so, an advantage is provided that the redox potential (i.e., operating potential) during charge and discharge is likely to be held constant at a high potential, so that the energy density is likely to increase.

In the positive electrode active material for a sodium-ion secondary battery according to the present invention, the crystals preferably have a crystal structure belonging to a triclinic space group P1 or P-1.

A positive electrode material for a sodium-ion secondary battery according to the present invention has a feature of containing the above-described positive electrode active material for a sodium-ion secondary battery.

The positive electrode material for a sodium-ion secondary battery according to the present invention preferably contains a sodium ion-conductive solid electrolyte.

The positive electrode material for a sodium-ion secondary battery according to the present invention preferably contains, in terms of % by mass, 30 to 100% the positive electrode active material for a sodium-ion secondary battery, 0 to 70% the sodium ion-conductive solid electrolyte, and 0 to 20% conductive agent.

A positive electrode for a sodium-ion secondary battery according to the present invention has a feature that the above-described positive electrode material for a sodium-ion secondary battery is used therein.

A sodium-ion secondary battery according to the present invention has a feature of including the above-described positive electrode for a sodium-ion secondary battery.

Advantageous Effects of Invention

The present invention enables provision of a novel positive electrode active material for a sodium-ion secondary battery having a high voltage and a high capacity.

DESCRIPTION OF EMBODIMENTS (Positive Electrode Active Material for Sodium-Ion Secondary Battery)

A positive electrode active material for a sodium-ion secondary battery according to the present invention has a feature of being made of crystals represented by a general formula $Na_x(Co_{1-a}M_a)_yP_2O_z$ (where M represents at least one transition metal element selected from the group consisting of Fe, Cr, Mn, and Ni, $0.6 \leq x \leq 4$, $0.3 \leq y \leq 2.7$, $0 \leq a \leq 0.9$, and $6 \leq z < 7.5$). Reasons why the crystal composition is limited as just described will be described below.

The value x is preferably in a range of $0.6 \leq x \leq 4$, more preferably $0.7 \leq x < 2$, and particularly preferably $1 \leq x \leq 1.9$. If the value x is too small, the amount of sodium ions contributing to absorption and release becomes small, so that the discharge capacity tends to decrease. On the other hand, if the value x is too large, other crystals not contributing to charge and discharge, such as $Na_3PO_4$, precipitate, so that the discharge capacity tends to decrease.

The value y is preferably in a range of $0.3 \leq y \leq 2.7$, more preferably $0.7 \leq y \leq 2$, and particularly preferably $1 < y \leq 1.3$. If the value y is too small, the amount of transition metal elements for use in the redox reaction becomes small and, therefore, the amount of sodium ions contributing to absorption and release also becomes small, so that the discharge capacity tends to decrease. On the other hand, if the value y is too large, other crystals not contributing to charge and discharge, such as CoO, precipitate, so that the discharge capacity tends to decrease.

The value z is preferably in a range of $6 \leq z < 7.5$, more preferably $6.3 \leq z \leq 7.3$, and particularly preferably $6.7 \leq z \leq 7.1$. If the value z is too small, the amount of phosphoric acid component not involved in charge and discharge increases, so that the discharge capacity is likely to decrease. On the other hand, if the value z is too large, the skeletal component of the crystals consists mainly of orthophosphoric acid ($PO_4$). Therefore, oxygen extraction is likely to occur in the redox reaction of Co during charge and discharge, so that the discharge capacity is likely to decrease.

M representing a transition metal element may be at least one selected from the group consisting of Fe, Cr, Ni, and Mn. When M is Ni or Mn, this is preferred because Ni and Mn exhibit particularly high operating voltages. Particularly preferred is Ni because it has a high operating voltage. Furthermore, when M is Fe, this is preferred because Fe has high structural stability during charge and discharge to make the cycle characteristics likely to increase.

The value a is preferably $0 \leq a \leq 0.9$, more preferably $0 \leq a \leq 0.5$, still more preferably $0 \leq a \leq 0.3$, and particularly preferably $a = 0$. As the value a is smaller, the redox potential becomes higher, so that when the positive electrode active material is used for a power storage device, it is likely to exhibit a high operating voltage.

When the crystals represented by the general formula $Na_x(Co_{1-a}M_a)_yP_2O_z$ are triclinic, this is preferred because they have excellent structural stability and excellent cycle characteristics. Furthermore, the crystals preferably belong to the space group P1 or P-1.

Specific examples of the crystals include those mentioned below (wherein items in each pair of parentheses are a general formula normalized to give 2 for the factor of phosphor P, a crystal structure and a space group, and a theoretical capacity): $Na_4Co_5(PO_4)_2(P_2O_7)_2$ ($=Na_{1.33}Co_{1.67}P_2O_{7.3}$, monoclinic P21/c, theoretical capacity: 116 mAh/g), $Na_{3.64}Co_{2.18}(P_2O_7)_2$ ($=Na_{1.82}Co_{1.09}P_2O_7$, triclinic P-1, theoretical capacity: 104 mAh/g), $Na_{3.12}Co_{2.44}(P_2O_7)_2$ ($=Na_{1.56}Co_{1.22}P_2O_7$, triclinic P-1, theoretical capacity: 116 mAh/g), $Na_{5.6}Co_4P_8O_{28}$ ($=Na_{1.4}CoP_2O_7$, triclinic P-1, theoretical capacity: 103 mAh/g), $Na_2CoP_2O_7$ (triclinic P-1 or P1 or orthorhombic P21cn, theoretical capacity: 104 mAh/g), and $Na_4Co(PO_3)_6$ ($=Na_{1.33}Co_{0.33}P_2O_6$, theoretical capacity: 43 mAh/g).

Among them, $Na_{3.12}Co_{2.44}(P_2O_7)_2$, $Na_{3.64}Co_{2.18}(P_2O_7)_2$, $Na_{5.6}Co_4P_8O_{28}$, and $Na_2Co(P_2O_7)$ are preferred, $Na_{3.12}Co_{2.44}(P_2O_7)_2$ and $Na_{3.64}Co_{2.18}(P_2O_7)_2$ are particularly preferred because of their high capacities and excellent cycle stability, and $Na_{3.64}Co_{2.18}(P_2O_7)_2$ is most preferred because of its more excellent cycle stability.

As the crystallite size of the crystals is smaller, the average particle diameter of the positive electrode active material particles can be made smaller, so that the electrical conductivity can be more increased. Specifically, the crystallite size is preferably 100 nm or less and particularly preferably 80 nm or less. The lower limit of the crystallite size is not particularly limited but is, actually, preferably not less than 1 nm and more preferably not less than 10 nm. The crystallite size can be determined from analysis results of powder X-ray diffraction of the crystals according to the Scherrer equation.

The positive electrode active material for a power storage device according to the present invention may be coated or formed into a composite with electrically conductive carbon. By doing so, the electronic conductivity becomes high and, thus, the rapid charge/discharge characteristics are likely to increase. Examples of the electrically conductive carbon that can be used include carbon powders, carbon fibers and other types of carbons, such as highly electrically conductive carbon blacks, such as acetylene black and Ketjenblack, and graphite. Preferred among them is acetylene black because of its high electronic conductivity.

An example of a method for coating the positive electrode active material with an electrically conductive carbon is a method of mixing the positive electrode active material with an organic compound which is a source of the electrically conductive carbon and then firing the mixture in an inert or reducing atmosphere to carbonize the organic compound. Any material may be used as the organic compound so far as it can remain as carbon in the process of heat treatment, but glucose, citric acid, ascorbic acid, phenolic resin, a surfactant or the like is preferably used, and a surfactant is particularly preferred because it is easily adsorbable on the surface of the positive electrode active material. The surfactant may be any of a cationic surfactant, an anionic surfactant, an amphoteric surfactant, and a non-ionic surfactant, but a non-ionic surfactant is particularly preferred because of its excellent adsorbability on the surface of the positive electrode active material.

The mixing ratio between the positive electrode active material and the electrically conductive carbon is, in terms of mass ratio, preferably 80-99.5:0.5-20 and more preferably 85-98:2-15. If the content of the electrically conductive carbon is too small, the electronic conductivity tends to be poor. On the other hand, if the content of the electrically conductive carbon is too large, the content of the positive electrode active material becomes relatively small and, therefore, the discharge capacity tends to decrease.

Note that when the surface of the positive electrode active material is coated with an electrically conductive carbon, the thickness of the electrically conductive carbon coating is preferably 1 to 100 nm and particularly preferably 5 to 80 nm. If the thickness of the electrically conductive carbon coating is too small, the electrically conductive carbon coating is likely to be lost in the process of charging/discharging to deteriorate the battery characteristics. On the other hand, if the thickness of the electrically conductive carbon coating is too large, a decrease in discharge capacity, a voltage drop, and so on are likely to occur.

In the positive electrode active material for a sodium-ion secondary battery according to the present invention, the ratio (D/G) of a peak intensity D between 1300 and 1400 $cm^{-1}$ to a peak intensity G between 1550 and 1650 $cm^{-1}$, both measured by Raman spectroscopy, is preferably 1 or less and particularly preferably 0.8 or less, and the ratio (F/G) of a peak intensity F between 800 to 1100 cm$^{-1}$ to the peak intensity G is preferably 0.5 or less and particularly preferably 0.1 or less. When these peak intensity ratios satisfy the above ranges, the electronic conductivity of the positive electrode active material tends to be high.

No particular limitation is placed on the form of the positive electrode active material for a power storage device, but a powdered form is preferred because the number of sites for absorption and release of sodium ions is increased. In this case, its average particle diameter is preferably 0.1 to 20 μm, more preferably 0.3 to 15 μm, still more preferably 0.5 to 10 μm, and particularly preferably 0.6 to 5 μm. Furthermore, its maximum particle diameter is preferably 150 μm or less, more preferably 100 μm or less, still more preferably 75 μm or less, and particularly preferably 55 μm or less. If the average particle diameter or maximum particle diameter is too large, the number of sites for absorption and release of sodium ions during charge and discharge becomes small and, therefore, the discharge capacity tends to decrease. On the other hand, if the average particle diameter is too small, the dispersed state of powder when the positive electrode active material is produced in paste form tends to be poor, which makes it difficult to produce a uniform electrode.

Herein, the average particle diameter and the maximum particle diameter refer to a median primary particle diameter $D_{50}$ (diameter at 50% cumulative volume) and a median primary particle diameter $D_{99}$ (diameter at 99% cumulative volume), respectively, and are values measured by a laser diffraction particle size distribution measurement device.

(Positive Electrode Material for Sodium-Ion Secondary Battery)

A positive electrode material for a sodium-ion secondary battery can be obtained by mixing the positive electrode active material for a sodium-ion secondary battery according to the present invention with a conductive agent, a binder, and so on.

Examples of the conductive agent include powdered or fibrous electrically conductive carbons and the like, such as highly electrically conductive carbon blacks, such as acetylene black and Ketjenblack, and graphite. Preferred among them is acetylene black because it can increase the electrical conductivity even when added in small amount.

The binder is a component to be added to a positive electrode active material in order to bind together materials forming a positive electrode material and prevent the positive electrode active material from peeling from the positive electrode due to a volume change during charge and discharge. Specific examples of the binder include thermoplastic straight-chain polymers, such as polytetrafluoroethylene (PTFE), poly(vinylidene fluoride) (PVDF), fluorine-containing rubbers, and styrene-butadiene rubber (SBR); thermosetting resins, such as thermosetting polyimide, polyamide-imide, polyamide, phenolic resin, epoxy resin, urea resin, melamine resin, unsaturated polyester resin, and polyurethane; cellulose derivatives, such as carboxymethyl cellulose (including salts of carboxymethyl cellulose, such as sodium carboxymethyl cellulose, the same applies hereafter), hydroxypropylmethyl cellulose, hydroxypropyl cellulose, hydroxyethyl cellulose, ethyl cellulose, and hydroxymethyl cellulose; and water-soluble polymers, such as polyvinyl alcohol, polyacrylamide, polyvinyl pyrrolidone, and their copolymers. Among them, thermosetting resins, cellulose derivatives, and water-soluble polymers are preferred because of their excellent binding properties and thermosetting polyimide or carboxymethyl cellulose is more preferred because of their industrially widespread use. Particularly, carboxymethyl cellulose is most preferred because it is inexpensive and has such low environmental burden that it does not need any organic solvent in preparing a paste for electrode formation. These binders may be used singly or in a mixture of two or more of them.

In using the positive electrode active material for a sodium-ion secondary battery according to the present invention as a solid-state sodium-ion secondary battery, a sodium ion-conductive solid electrolyte is preferably added as a component of the positive electrode material for a sodium-ion secondary battery. The sodium ion-conductive solid electrolyte is a component that plays a role in conducting sodium ions between a positive electrode and a negative electrode in an all-solid-state power storage device. The sodium ion-conductive solid electrolyte is preferably beta-alumina or NASICON crystals because they have excellent sodium-ion conductivity. Beta-alumina includes two types of crystals: β alumina (theoretical composition formula: $Na_2O \cdot 11Al_2O_3$) and β" alumina (theoretical composition formula: $Na_2O \cdot 5.3Al_2O_3$). Because β" alumina is a metastable material, it is generally used in a state in which $Li_2O$ or MgO is added as a stabilizing agent thereto. Because β" alumina has a higher sodium-ion conductivity than β alumina, β" alumina alone or a mixture of β" alumina and β alumina is preferably used and $Li_2O$-stabilized β" alumina ($Na_{1.6}Li_{0.34}Al_{10.66}O_{17}$) or MgO-stabilized β" alumina (($Al_{10.32}Mg_{0.68}O_{10}$ ($Na_{1.68}O$))) is more preferably used.

Preferred examples of the NASICON crystal include $Na_3Zr_2Si_2PO_{12}$, $Na_{3.2}Zr_{1.3}Si_{2.2}P_{0.8}O_{10.5}$, $Na_3Zr_{1.6}Ti_{0.4}Si_2PO_{12}$, $Na_3Hf_2Si_2PO_{12}$, $Na_{3.4}Zr_{0.9}Hf_{1.4}Al_{0.6}Si_{1.2}P_{1.8}O_{12}$, $Na_3Zr_{1.7}Nb_{0.24}Si_2PO_{12}$, $Na_{3.6}Ti_{0.2}Y_{0.8}Si_{2.8}O_9$, $Na_3Zr_{1.88}Y_{0.12}Si_2PO_{12}$, $Na_{3.12}Zr_{1.88}Y_{0.12}Si_2PO_{12}$, and $Na_{3.6}Zr_{0.13}Yb_{1.67}Si_{0.11}P_{2.9}O_{12}$ and the particularly preferred is $Na_{3.12}Zr_{1.88}Y_{0.12}Si_2PO_{12}$ because it has excellent sodium-ion conductivity.

The average particle diameter $D_{50}$ of the sodium ion-conductive solid electrolyte is preferably 0.3 to 25 μm, more preferably 0.5 to 20 μm, and particularly preferably 1.2 to 15 μm. If the average particle diameter $D_{50}$ of the sodium ion-conductive solid electrolyte is too small, not only the sodium ion-conductive solid electrolyte becomes difficult to uniformly mix with the positive electrode active material, but also becomes likely to decrease the ionic conductivity because it absorbs moisture or becomes carbonated. As a result, the internal resistance tends to increase to decrease the charge/discharge voltage and discharge capacity. On the other hand, if the average particle diameter $D_{50}$ of the sodium ion-conductive solid electrolyte is too large, this significantly inhibits the softening and flow of the positive electrode active material during firing for the formation of a positive electrode layer, so that the resultant positive electrode layer tends to have poor smoothness to decrease the mechanical strength and tends to increase the internal resistance.

The composition of the positive electrode material is preferably appropriately selected depending on the type of electrolyte used. For example, in a sodium-ion secondary battery in which an aqueous or nonaqueous liquid electrolyte is used, the positive electrode material preferably contains, in terms of % by mass, 70 to 95% positive electrode active material, 1 to 15% conductive agent, and 3 to 15% binder and more preferably contains 80 to 95% positive electrode active material, 2 to 10% conductive agent, and 3 to 10% binder. If the content of positive electrode active material is too small, the discharge capacity of the sodium-ion secondary battery is likely to decrease. If the content of positive electrode active material is too large, the contents of conductive agent and binder become relatively small, so that the electronic conductivity and cycle characteristics are likely to decrease. If the content of conductive agent is too small, the electronic conductivity tends to be poor. If the content of conductive agent is too large, the bindability between the components of the positive electrode material decreases to increase the internal resistance and, therefore, the charge/discharge voltage and discharge capacity tend to decrease. If the content of binder is too small, the bindability between the components of the positive electrode material decreases, so that the cycle characteristics are likely to decrease. If the content of binder is too large, the electronic conductivity decreases and, therefore, the rapid charge/discharge characteristics are likely to decrease.

In the case of a solid-state sodium-ion secondary battery in which a sodium ion-conductive solid electrolyte is used as the electrolyte, the positive electrode material preferably contains, in terms of % by mass, 30 to 100% positive electrode active material, 0 to 20% conductive agent, and 0 to 70% solid electrolyte, more preferably contains 34.5 to 94.5% positive electrode active material, 0.5 to 15% conductive agent, and 5 to 65% solid electrolyte, and still more preferably contains 40 to 92% positive electrode active material, 1 to 10% conductive agent, and 7 to 50% solid electrolyte. If the content of positive electrode active material is too small, the discharge capacity of the sodium-ion secondary battery is likely to decrease. If the content of conductive agent or solid electrolyte is too large, the bindability between the components of the positive electrode material decreases to increase the internal resistance and, therefore, the charge/discharge voltage and discharge capacity tend to decrease.

The mixing of the components of the positive electrode material can be made using a mixer, such as a planetary centrifugal mixer or a tumbler mixer, or a general grinder, such as a mortar, a mortar mixer, a ball mill, an attritor, a vibrating ball mill, a satellite ball mill, a planetary ball mill, a jet mill or a bead mill. Particularly, the use of a planetary ball mill enables homogeneous dispersion of the components.

The positive electrode material for a sodium-ion secondary battery according to the present invention is used as a positive electrode for a sodium-ion secondary battery by applying the positive electrode material onto a current collector formed of a metal foil, such as aluminum, copper or gold, drying it, and, if necessary, then firing it. Alternatively, it is possible to form the positive electrode material for a sodium-ion secondary battery according to the present invention into a sheet shape and then form thereon a current collector formed of a metal coating by sputtering, plating or other processes.

(Sodium-Ion Secondary Battery)

A sodium-ion secondary battery according to the present invention includes, in addition to the above positive electrode for a sodium-ion secondary battery, a negative electrode as a counter electrode and an electrolyte.

The negative electrode contains a negative electrode active material capable of absorbing and releasing sodium ions during charge and discharge. Examples of the negative electrode active material that can be used include metallic materials, such as metallic Na, metallic Sn, metallic Bi, metallic Zn, Sn—Cu alloy, and Bi—Cu alloy, carbon materials, such as hard carbon, and oxide materials containing Ti and/or Nb as an element. Preferred among them are oxide materials containing Ti and/or Nb as an element because they have high safety and are rich as resources. Particularly preferably used are oxide materials containing a crystalline phase represented by $Na_4TiO(PO_4)_2$ or $Na_5Ti(PO_4)_3$ that has a redox potential of 1.5 V or less (vs. $Na/Na^+$) during charge and discharge. In this case, the operating voltage of the sodium-ion secondary battery becomes high, so that dendrites of metallic Na can be inhibited from precipitating during repeated charge and discharge.

Electrolytes that can be used include an aqueous electrolyte, a nonaqueous electrolyte, and a solid electrolyte. Nonaqueous electrolytes or solid electrolytes have wide potential windows and, therefore, produce little gas due to electrolyte decomposition during charge and discharge, so that the safety of the sodium-ion secondary battery can be increased. Among them, solid electrolytes are preferred because of their non-flammability.

Aqueous electrolytes contain a water-soluble electrolyte salt. Examples of the electrolyte salt include $NaNO_3$, $Na_2SO_4$, $NaOH$, $NaCl$, and $CH_3COONa$. These electrolyte salts may be used singly or in a mixture of two or more of them. The electrolyte salt concentration is appropriately adjusted, generally, within a range of 0.1M to the saturation concentration.

Note that in using an aqueous electrolyte, the redox potential of the positive electrode active material for a sodium-ion secondary battery according to the present invention can be used only within the potential window of water.

Nonaqueous electrolytes contain: an organic solvent and/or an ionic liquid both of which are nonaqueous solvents; and an electrolyte salt dissolved in the nonaqueous solvent. No particular limitation is placed on the type of the organic solvent as the nonaqueous solvent, and examples include propylene carbonate (PC), ethylene carbonate (EC), 1,2-dimethoxyethane (DME) γ-butyrolactone (GBL), tetrahydrofuran (THF), 2-methyltetrahydrofuran (2-MeHF), 1,3-dioxolan, sulfolane, acetonitrile (AN), diethyl carbonate (DEC), dimethyl carbonate (DMC), methylethyl carbonate (MEC), and dipropyl carbonate (DPC). These nonaqueous solvents may be used singly or in a mixture of two or more of them. Among them, propylene carbonate is preferred because of its excellent low-temperature characteristics.

No particular limitation is also placed on the type of the ionic liquid so long as it can dissolve an electrolyte salt used, and specific examples include: aliphatic quaternary ammonium salts, such as N,N,N-trimethyl-N-propyl ammonium bis(trifluoromethanesulfonyl)imide [abbr. TMPA-TFSI], N-methyl-N-propylpiperidinium bis(trifluoromethanesulfonyl)imide [abbr. PP13-TFSI], N-methyl-N-propylpyrrolidinium bis(trifluoromethanesulfonyl)imide [abbr. P13-TFSI], and N-methyl-N-butylpyrrolidinium bis(trifluoromethanesulfonyl)imide [abbr. P14-TFSI]; and quaternary alkylimidazolium salts, such as 1-methyl-3-ethylimidazolium tetrafluoroborate [abbr. EMIBF4], 1-methyl-3-ethylimidazolium bis(trifluoromethanesulfonyl)imide [abbr. EMITFSI], 1-allyl-3-ethylimidazolium bromide [abbr. AEImBr], 1-allyl-3-ethylimidazolium tetrafluoroborate [abbr. AEImBF4], 1-allyl-3-ethylimidazolium bis(trifluoromethanesulfonyl)imide [abbr. AEImTFSI], 1,3-diallylimidazolium bromide [abbr. AAImBr], 1,3-diallylimidazolium tetrafluoroborate [abbr. AAImBF4], and 1,3-diallylimidazolium bis(trifluoromethanesulfonyl)imide [abbr. AAImTFSI].

Examples of the electrolyte salt include sodium salts of $PF_6^-$, $BF_4^-$, $(CF_3SO_2)_2N^-$ (bis(trifluoromethanesulfonyl) amide, commonly called TFSI), $CF_3SO_3^-$ (commonly called TFS), $(C_2F_5SO_2)_2N^-$ (bis(pentafluoroethanesulfonyl)amide, commonly called BETI), $ClO_4^-$, $AsF_6^-$, $SbF_6^-$, bis(oxalato) boric acid ($B(C_2O_4)_2^-$, commonly called BOB), and difluoro (trifluoro-2-oxide-2-trifluoro-methyl propionate(2-)-0,0)boric acid ($BF_2OCOOC(CF_3)^{3-}$, commonly called B(HHIB)). These electrolyte salts may be used singly or in a mixture of two or more of them. Particularly preferred are sodium salts of $PF^{6-}$ and $BF^{4-}$, which are inexpensive. The electrolyte salt concentration is appropriately adjusted, generally, within a range of 0.5M to 3M.

The nonaqueous electrolyte may contain an additive, such as vinylene carbonate (VC), vinylene acetate (VA), vinylene butyrate, vinylene hexanoate, vinylene crotonate or catechol carbonate. These additives serve to form a protective film on the surface of the active material. The concentration of additive is, relative to 100 parts by mass of nonaqueous electrolyte, preferably 0.1 to 3 parts by mass and particularly preferably 0.5 to 1 part by mass.

Solid electrolytes that can be used are as described previously. Solid electrolytes have wide potential windows as compared to aqueous and nonaqueous electrolytes and, therefore, produce little gas due to decomposition, so that the safety of the sodium-ion secondary battery can be increased. Therefore, the positive electrode active material for a sodium-ion secondary battery according to the present invention is also most preferably used as a positive electrode active material for an all-solid-state sodium-ion secondary battery in which a solid electrolyte is used.

In the case of a sodium-ion secondary battery based on an electrolytic solution in which an aqueous electrolyte or a nonaqueous electrolyte is used, a separator is preferably provided between the electrodes. The separator is made of a material having insulation properties and specific examples of the material that can be used include: porous film or non-woven fabric obtained from a polymer, such as polyolefin, cellulose, polyethylene terephthalate or vinylon; non-woven glass fabric containing fibrous glass; glass cloth in which fibrous glass is woven; and film-like glass.

EXAMPLES

Hereinafter, a description will be given in detail of the present invention with reference to its working examples, but the present invention is not at all limited by the following working examples.

Table 1 shows working examples (Nos. 1 to 3) of the present invention and comparative examples (Nos. 4 and 5).

position described in Nos. 1 to 5 of Table 1, thus preparing a raw material batch. The raw material batch was mixed in ethanol using a planetary ball mill and then dried at 100° C. The dried raw material batch was pre-fired in an electric furnace at 600° C. (900° C. as for Nos. 4 and 5) for six hours and thus degassed. The pre-fired raw material batch was pressed into a shape at 500 kgf/cm² and then fired in an air atmosphere at 700° C. (800° C. as for Nos. 4 and 5) for 12 hours. The obtained sintered body was ground for 12 hours with a ball mill using 20-mm diameter $ZrO_2$ balls and the ground product was air-classified to obtain a positive electrode active material powder (a powdered solid reactant) having an average particle diameter $D_{50}$ of 2 μm.

An amount of 100 parts by mass of positive electrode active material obtained in the above manner was mixed well with 21.4 parts by mass (corresponding to 12 parts by mass in terms of carbon) of polyethylene oxide nonylphenyl ether (HLB value: 13.3, weight average molecular weight: 660), which is a non-ionic surfactant, as a carbon source and 10 parts by mass of ethanol, followed by drying at 100° C. for about an hour. Thereafter, the mixture was fired in a nitrogen atmosphere at 650° C. (700° C. as for comparative examples Nos. 4 and 5) for an hour to carbonize the non-ionic surfactant, thus obtaining a positive electrode active material powder the surface of which was coated with carbon. The processes thus far described were conducted in an environment of a dew point temperature minus 30° C. or below.

The obtained positive electrode active material powders were subjected to powder X-ray diffraction measurement and Rietveld analysis to identify their crystal structures. From respective charts obtained by the powder X-ray diffraction measurement, the positive electrode active material powders were confirmed to have a crystallinity of 100%.

(1-b) Production of Positive Electrode

Acetylene black (Super C65 manufactured by Timcal) as a conductive agent and poly(vinylidene fluoride) as a binder were weighed and mixed with each of the positive electrode active material powders obtained in the above manner to give a ratio of positive electrode active material powder to conductive agent to binder of 90:5:5 (mass ratio) and the mixture was dispersed into N-methylpyrrolidinone (NMP),

TABLE 1

| | | 1 | 2 | 3 | 4 | 5 |
|---|---|---|---|---|---|---|
| Composition | $Na_2O$ | 30.3 | 26 | 26 | 25 | 28.6 |
| (% by mole) | CoO | 36.4 | 40.7 | 37 | 50 | 42.8 |
| | $P_2O_5$ | 33.3 | 33.3 | 37 | 25 | 28.6 |
| Type of Precipitated Crystal | | $Na_{3.64}Co_{2.18}(P_2O_7)_2$ | $Na_{3.12}Co_{2.44}(P_2O_7)_2$ | $Na_{5.6}Co_4(P_2O_7)_4$ | $NaCoPO_4$ | $Na_4Co_3(PO_4)_2(P_2O_7)$ |
| *Characters in [ ] represent a general formula normalized to give 2 for the factor of P. | | $[Na_{1.82}Co_{1.09}P_2O_7]$ | $[Na_{1.56}Co_{1.22}P_2O_7]$ | $[Na_{1.4}CoP_2O_7]$ | $[Na_2Co_2P_2O_8]$ | $[Na_{1.33}CoP_{1.33}O_5]$ |
| Crystal Structure | | triclinic | triclinic | triclinic | orthorhombic | orthorhombic |
| Space Group | | P-1 | P-1 | P-1 | Pnma | Pn21a |
| Crystallinity (% by mass) | | 100 | 100 | 100 | 100 | 100 |
| Electrolytic Solution-Based Cell | Discharge Capacity (mAh/g) | 73 | 76 | 72 | 6 | 68 |
| | Average Voltage (V) | 3.98 | 4.01 | 3.89 | 3.4 | 4.03 |
| | Energy Density (Wh/kg) | 291 | 305 | 280 | 20 | 274 |
| All-Solid-State Cell | Discharge Capacity (mAh/g) | 39 | 42 | Not measured | inoperative | 26 |
| | Average Voltage (V) | 4.08 | 4.06 | | | 3.8 |
| | Energy Density (Wh/kg) | 159 | 171 | | | 99 |

(1) Production of Electrolytic Solution-Based Sodium-Ion Secondary Cell (1-a) Production of Positive Electrode Active Material Sodium carbonate, sodium metaphosphate, cobalt oxide, and orthophosphoric acid were weighed to give each comfollowed by well stirring with a planetary centrifugal mixer to form a slurry, thus obtaining a positive electrode material.

Next, the obtained positive electrode material was coated on a 20-μm thick aluminum foil serving as a positive electrode current collector using a doctor blade with a gap of 125 μm, and the aluminum foil with the positive electrode material was vacuum-dried by a dryer at 70° C. and then pressed by passing it between a pair of rotating rollers to obtain an electrode sheet. This electrode sheet was punched out into an 11-mm diameter disc by an electrode cutting machine and dried at a temperature of 150° C. for eight hours under reduced pressure, thus obtaining a circular positive electrode.

(1-c) Production of Test Cell

Each test cell for a sodium-ion secondary battery was produced in the following manner. The positive electrode obtained in the above manner was placed, with its aluminum foil surface down, on a lower lid of a coin cell, and a separator formed of a 16-mm diameter polypropylene porous film dried at 70° C. for eight hours under reduced pressure, a metallic sodium layer as a counter electrode, and an upper lid of the coin cell were laid one after another on the positive electrode, thus producing a test cell. A 1M NaPF6 solution/EC:DEC=1:1 (where EC is ethylene carbonate and DEC is diethyl carbonate) was used as an electrolytic solution. The assembly of the test cell was conducted in an environment of a dew-point temperature minus 70° C. or below.

(2) Production of all-Solid-State Sodium-Ion Secondary Cell (2-a) Preparation of Sodium Ion-Conductive Solid Electrolyte A bulk of $Li_2O$-stabilized $\beta''$ alumina having a composition formula $Na_{1.6}Li_{0.34}Al_{10.66}O_{17}$ (manufactured by Ionotec Ltd.) was processed by dry grinding to a thickness of 0.2 mm, thus obtaining a solid electrolyte sheet. Furthermore, another solid electrolyte sheet thus obtained was ground with a planetary ball mill and the ground product was air-classified, thus preparing a solid electrolyte powder (having an average particle diameter of 1.5 μm). The above solid electrolyte sheet and powder were produced in an environment of a dew point minus 50° C. or below for the purpose of preventing degradation due to moisture absorption.

(2-b) Production of Test Cell

Each of the positive electrode active material powders of Nos. 1, 2, 4, and 5 obtained as described above, the solid electrolyte powder, and acetylene black (Super C65 manufactured by Timcal) as a conductive agent were weighed in a ratio of 72:25:3 and mixed for 30 minutes using an agate mortar and an agate pestle. Added to 100 parts by mass of the obtained mixed powder were 10 parts by mass of polypropylene carbonate and additionally 40 parts by mass of N-methylpyrrolidinone. The mixture was stirred well with a planetary centrifugal mixer to form a slurry.

The obtained slurry was applied, with an area of 1 cm² and a thickness of 70 μm, to one side of the solid electrolyte sheet and then dried at 70° C. for three hours. Thereafter, the product was pre-fired by holding it at 350° C. for an hour in nitrogen. Thereafter, the product was fired, with a hot isostatic press, at 500° C. under 50 MPa for 10 minutes in argon, thus forming a positive electrode layer on the surface of the solid electrolyte sheet.

When the powder X-ray diffraction patterns of the materials making up each of the positive electrode layers were checked, diffraction lines originating from the crystals described in Table were confirmed. Furthermore, regarding all the positive electrodes, respective crystalline diffraction lines originating from the solid electrolyte powders used were confirmed.

Next, a current collector formed of a 300-nm thick gold electrode was formed on the surface of the positive electrode layer using a sputtering device (SC-701AT manufactured by Sanyu Electron Co., Ltd.). Furthermore, in an argon atmosphere of a dew point minus 70° C. or below, metallic sodium serving as a counter electrode was pressure-bonded to the surface of the solid electrolyte layer opposite to the surface thereof on which the positive electrode layer was formed. The obtained laminate was placed on a lower lid of a coin cell and covered with an upper lid to produce a CR2032-type test cell.

(3) Charge and Discharge Test

As for the electrolytic solution-based sodium-ion secondary cells, each test cell was CC (constant-current) charged at 30° C. from an open circuit voltage to 5.0 V and its amount of electricity charged to the positive electrode active material per unit mass (first charge capacity) was determined. Next, the test cell was CC discharged from 5.0 V to 2 V and its amount of electricity discharged from the positive electrode active material per unit mass (first discharge capacity) was determined. The C-rate was 0.1 C.

As for the all-solid-state sodium-ion secondary cells, each test cell was CC (constant-current) charged at 60° C. from an open circuit voltage to 5.0 V and its amount of electricity charged to the positive electrode active material per unit mass (first charge capacity) was determined. Next, the test cell was CC discharged from 5.0 V to 2 V and its amount of electricity discharged from the positive electrode active material per unit mass (first discharge capacity) was determined. The C-rate was 0.01 C.

The results of the charge and discharge characteristics are shown in Table 1. In the table, "Discharge Capacity" refers to the first discharge capacity, "Average Voltage" refers to the average operating voltage during the first discharge, and "Energy Density" refers to the product of discharge capacity and average voltage.

As shown in Table 1, regarding Nos. 1 to 3 which are working examples, the discharge capacities of the electrolytic solution-based cells were 72 to 76 mAh/g and the average voltages thereof were 3.89 to 4.01 V, so that the energy densities thereof were 280 to 305 Wh/kg. Furthermore, regarding Nos. 1 and 2, the discharge capacities of the all-solid-state cells were 39 to 42 mAh/g and the average voltages thereof were 4.06 to 4.08 V, so that the energy densities thereof were 159 to 171 Wh/kg.

On the other hand, regarding No. 4 which is a comparative example, the discharge capacity of the electrolytic solution-based cell was 6 mAh/g, the average voltage thereof was 3.4 V, and the energy density thereof was thus as low as 20 Wh/kg. Furthermore, its all-solid-state cell was inoperative. Regarding No. 5, the discharge capacity of the all-solid-state cell was as low as 26 mAh/g and the average voltage thereof was as low as 3.8 V, so that the energy density thereof was as low as 99 Wh/kg.

INDUSTRIAL APPLICABILITY

The positive electrode active material for a sodium-ion secondary battery according to the present invention is suitable for sodium-ion secondary batteries used in portable electronic devices, electric vehicles, electric power tools, backup emergency power supplies, and so on.

The invention claimed is:

1. A positive electrode material for a sodium-ion secondary battery, the positive electrode material containing a positive electrode active material being made of crystals represented by a general formula $Na_x(Co_{1-a}M_a)_yP_2O_z$ (where M represents at least one transition metal element selected from the group consisting of Cr, Ni, and Mn, $0.6 \leq x \leq 1.56$, $1 < y \leq 2.7$, $0 \leq a \leq 0.9$, and $6 \leq z < 7.5$), and containing no amorphous phase; and the positive electrode material containing, in terms of % by mass, 34.5 to 94.5% of the positive electrode active material, 5 to 65% sodium ion-conductive solid electrolyte, and 0.5 to 15% conductive agent.

2. The positive electrode material for a sodium-ion secondary battery according to claim 1, wherein the crystals have a crystal structure belonging to a triclinic space group P1 or P-1.

3. A positive electrode for a sodium-ion secondary battery, wherein the positive electrode material for a sodium-ion secondary battery according to claim 1 is used.

4. A sodium-ion secondary battery comprising the positive electrode for a sodium-ion secondary battery according to claim 3.

5. An all-solid-state sodium-ion secondary battery comprising:

a positive electrode including the positive electrode material for a sodium-ion secondary battery according to claim 1; and a solid electrolyte layer consisting of at least one sodium ion-conductive solid electrolyte selected from the group consisting of β"-alumina, β-alumina, and NASICON crystals.

* * * * *